United States Patent [19]

Piaskowski

[11] Patent Number: 4,791,542

[45] Date of Patent: Dec. 13, 1988

[54] FERRORESONANT POWER SUPPLY AND METHOD

[75] Inventor: Andrew D. Piaskowski, Brandon, Vt.

[73] Assignee: RFL Industries, Inc., Brandon, Vt.

[21] Appl. No.: 81,300

[22] Filed: Aug. 3, 1987

[51] Int. Cl.[4] ............................................ H02M 3/335
[52] U.S. Cl. ........................................ 363/17; 363/75; 363/91; 323/235; 323/248; 323/249
[58] Field of Search .................... 363/17, 75, 90, 91; 323/235, 248, 249

[56] References Cited

U.S. PATENT DOCUMENTS

| | | | |
|---|---|---|---|
| 3,072,837 | 1/1963 | Hakimoglu | 321/18 |
| 3,098,193 | 7/1963 | Wallace et al. | 323/66 |
| 3,098,196 | 7/1963 | Viernstein | 323/89 |
| 3,101,450 | 8/1963 | Takahashi et al. | 330/7 |
| 3,107,325 | 10/1963 | Toffolo | 321/18 |
| 3,117,274 | 1/1964 | Essinger | 323/56 |
| 3,129,375 | 4/1964 | Huntzinger | 321/16 |
| 3,241,035 | 3/1966 | Rhyne | 321/18 |
| 3,246,225 | 4/1966 | Willardson et al. | 321/2 |
| 3,323,039 | 5/1967 | Kusko | 323/45 |
| 3,341,766 | 9/1967 | Rhyne | 321/9 |
| 3,349,317 | 10/1967 | Kobayashi et al. | 321/68 |
| 3,356,927 | 12/1967 | Barron | 321/18 |
| 3,374,423 | 3/1968 | Hemmenway | 323/22 |
| 3,374,427 | 3/1968 | Fenoglio et al. | 323/89 |
| 3,404,329 | 10/1968 | Sevenco | 321/19 |
| 3,458,796 | 7/1969 | Cassady | 321/5 |
| 3,521,147 | 7/1970 | Ostreicher | 321/16 |
| 3,654,546 | 4/1972 | Wanlass | 323/6 |
| 3,965,408 | 6/1976 | Higuchi et al. | 363/15 |
| 4,385,263 | 5/1983 | Luz et al. | 323/306 |
| 4,673,888 | 6/1987 | Engelmann et al. | 363/14 |

OTHER PUBLICATIONS

Schneider G., "Designing Power Converters for Compliance with International Product Safety Standards", Power Concepts, Inc., Proceedings of Powercon 8, C1, pp. 1-9.

P. Vinciarelli, "Zero-Current Switching Converters", Electronic Engineering Times.

Primary Examiner—Patrick R. Salce
Assistant Examiner—Anita M. Ault
Attorney, Agent, or Firm—Martin M. Novack

[57] ABSTRACT

A power supply is disclosed which comprises a ferroresonant circuit, the ferroresonant circuit including a transformer with a core of magnetic material, a primary winding, a secondary winding, and reactive means coupled with at least one of the windings. The transformer also has at least one bias winding. An alternating voltage is applied to the ferroresonant circuit, the alternating voltage having a frequency that is approximately equal to a resonant frequency of the ferroresonant circuit. An output circuit is coupled to the secondary winding. A signal from the output circuit is applied as a feedback signal to the bias winding to control DC flux bias of the core. In an illustrated embodiment, the means for applying an alternating voltage signal to the ferroresonant circuit includes an oscillator for generating alternating voltage control signals, and a switching circuit responsive to an input power source for generating the alternating voltage signals under control of the oscillator. The switching circuit is preferably adapted to provide zero-current switching. The disclosed ferroresonant power supply can operate at relatively high frequencies, for example above 20 KHz and up to about 1 MHz, using standard core materials and without unacceptable losses. Control of the output is obtained by the ferroresonant circuit and without the need for frequency modulation or other circuit complications that are often used with zero-current switching techniques. Also, the disclosed power supply can operate over a wide range of input voltages.

42 Claims, 5 Drawing Sheets

FERRORESONANT POWER SUPPLY AND METHOD

BACKGROUND OF THE INVENTION

This invention relates to ferroresonant magnetic circuits and, more particularly, to ferroresonant magnetic power supplies and techniques.

The power supply art has evolved over the years, and improvements in switching transistor technology and in transformer materials have had a particularly favorable effect in improving the performance and reliability of available power supplies. However, it is widely recognized that there is still much room for improvement in the efficiency, reliability and electromagnetic interference characteristics of modern power supplies.

A promising development in power supply technology is the use of zero current switching techniques, and the adaptation of such techniques for use in power supplies at high frequencies. Power supplies utilizing zero current switching have exhibited improved efficiency, reliability and EMI characteristics, but the complexity of many designs has been problematic. For example, in a zero current switching power supply, it is common to utilize frequency modulation for controlling the output. This adds complexity to the design of the power supply, and also has the disadvantage of unpredictability of the fundamental frequency, which can be a problem for certain applications, e.g. communications systems.

Power supplies employing a ferroresonant transformer are well known in the art. In many cases, the ferroresonant transformer is utilized for regulation purposes. Examples of such circuits, as well as other approaches using ferroresonant circuits can be found among the following U.S. Pat. Nos. 3,072,837, 3,098,193, 3,098,196, 3,101,450, 3,107,325, 3,117,274, 3,129,375, 3,241,035, 3,246,225, 3,323,039, 3,341,766, 3,349,317, 3,356,927, 3,374,423, 3,374,427, 3,404,329, 3,458,796, 3,521,147 and, 3,654,546.

Ferroresonant power supplies tend to be simple and reliable, and can operate from common supply frequency. They have extremely good input/output isolation and provide good regulation. Also, they can operate over a relatively wide range of input voltages. On the other hand, existing ferroresonant power supplies are generally large and heavy due to operation at relatively low frequency. Regulation, while often adequate, is not easily controllable. Also, output rail voltages tend to be dependent on supply frequency stability.

The ferroresonance principle involves the modulation of winding inductances on a cycle-to-cycle basis, and the transformer core operates in saturation mode during portions of the cycle. This factor has generally limited the frequencies at which ferroresonance power supplies can operate. If frequency of operation is raised beyond a certain point, core losses become severe. Even expensive core materials, which may have relatively better operating characteristics and temperature stability at higher frequency, still do not permit operation at as high a frequency as may be desirable for some designs.

It is among the object of the present invention to provide a ferroresonant power supply and method which can utilize a wide range of core materials and attain higher frequency operation than is presently available with a particular core material. It is also among the objects of the invention to provide a power supply with well controlled output regulation and to provide single frequency of operation despite load variations. It is among the further objectives of the invention to utilize zero current switching in a new type of power supply configuration, so as to obtain the advantages of zero current switching, but without the complexity attendant typical zero current switching designs.

SUMMARY OF THE INVENTION

In accordance with an embodiment of the invention, there is provided a power supply which comprises a ferroresonant circuit, the ferroresonant circuit including a transformer with a core of magnetic material, a primary winding, a secondary winding, and reactive means coupled with at least one of the windings. The transformer also has at least one bias winding. Means are provided for applying an alternating voltage to the ferroresonant circuit, the alternating voltage having a frequency that is approximately equal to a resonant frequency of the ferroresonant circuit. An output circuit is coupled to the secondary winding. Means are provided for sensing a signal in the output circuit and for applying a feedback signal to the bias winding in accordance with the sensed signal.

In an illustrated embodiment of the invention, a capacitor is coupled across the primary winding, and an inductor is coupled to the capacitor. In this embodiment, the transformer has one or more additional secondary windings, and one or more further output circuits are provided and respectively coupled to the further secondary windings. In a form of this embodiment of the invention, the frequency of the alternating voltage signal applied to the ferroresonant circuit is greater than 20 KHz.

In the illustrated embodiment of the invention, the means for applying an alternating voltage signal to the ferroresonant circuit includes an oscillator for generating alternating voltage control signals, and a switching circuit responsive to an input power source for generating the alternating voltage signals under control of the oscillator. The switching circuit is preferably adapted to provide zero-current switching.

The ferroresonant power supply of the present invention can operate at relatively high frequencies, for example above 20 KHz and up to about 1 MHz, using standard core materials and without unacceptable losses. Control of the output is obtained by the ferroresonant circuit and without the need for frequency modulation or other circuit complications that are often used with zero-current switching techniques. Also, the power supply hereof can operate over a wide range of input voltages.

Further features and advantages of the invention will become more readily apparent from the following detailed description when taken in conjunction with the accompanying drawings.

DESCRIPTION OF THE PREFERRED EMBODIMENT

Figure 1:
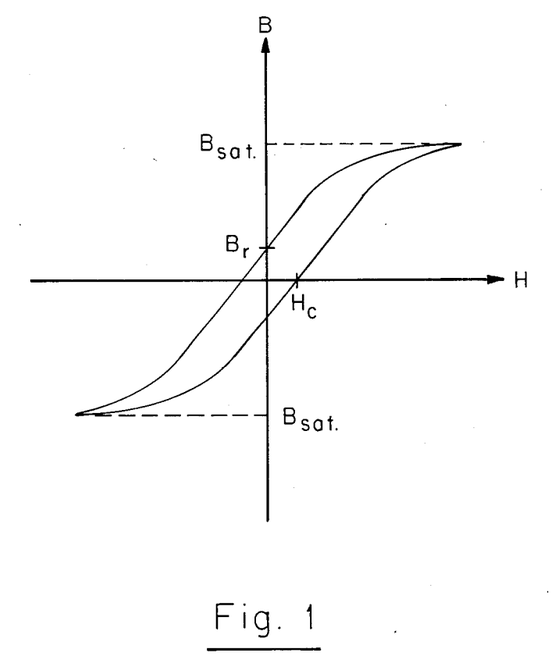
FIG. 1 is a graph of the B-H characteristic of a ferrite material.

To assist in understanding of the preferred embodiment, consider first the example of a B-H characteristic of a ferrite material as shown in FIG. 1. In the Figure, B is flux density, H is field strength, $B_r$ is remnant flux (at H=0) and $H_c$ is coercive force (at B=0). "Saturation" of the core material is said to occur when an increase of field strength ceases to orient magnetic domains and maximum flux density in the material is reached. As the core material is cycled between the saturation states, designated $-B_{sat}$ and $+B_{sat}$, an energy loss per cycle is experienced. As is well known, the greater the frequency, the greater the power loss. The losses can be approximately represented by the following relationship:

$$P_L = KB^2 f$$

where:
 $P_L$ is power loss in watts;
 K is a material/core constant;
 B is flux density; and
 f is frequency of cycling.

As seen from this relationship, losses are heavily dependent on flux density. Operation of most materials below saturation levels can give acceptable loss factors. However, if a typical power ferrite is used in a ferroresonant application at a relatively high frequency (for example, above 20 KHz), losses in saturation can become unacceptable, particularly as frequency increases. Since the area inside the B-H loop is related to losses of the core material, an objective is to decrease this area and still maintain saturation for ferroresonance to occur.

It is known, for example in applications such as control of lighting or heaters, that a constant flux bias can be employed in a magnetic amplifier, so that the alternating flux component adds to or substracts from the constant flux component, such that saturation occurs on a cycle to cycle basis. This results in operation of the core in saturation, but with the net losses being substantially at the reduced flux level associated with the AC flux component. The principle is illustrated diagrammatically in FIGS. 2 and 3.

Figure 2:
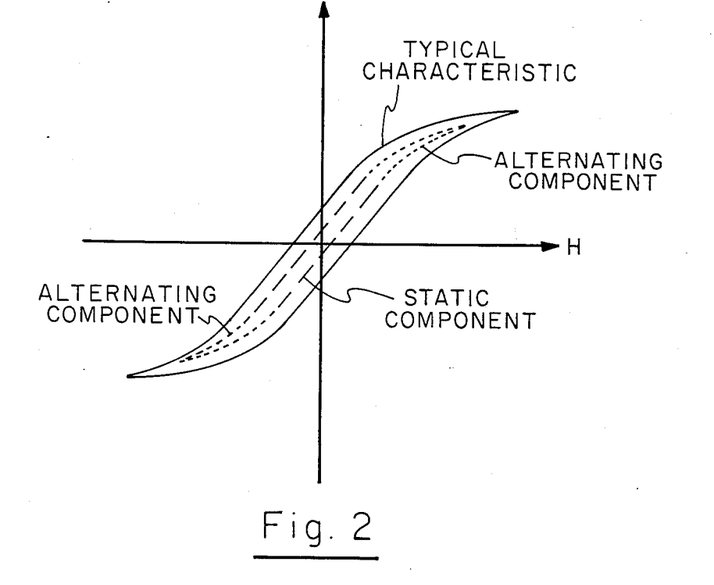
FIG. 2 illustrates another B-H curve which includes a DC (or static) component and an alternating component.
Figure 3:
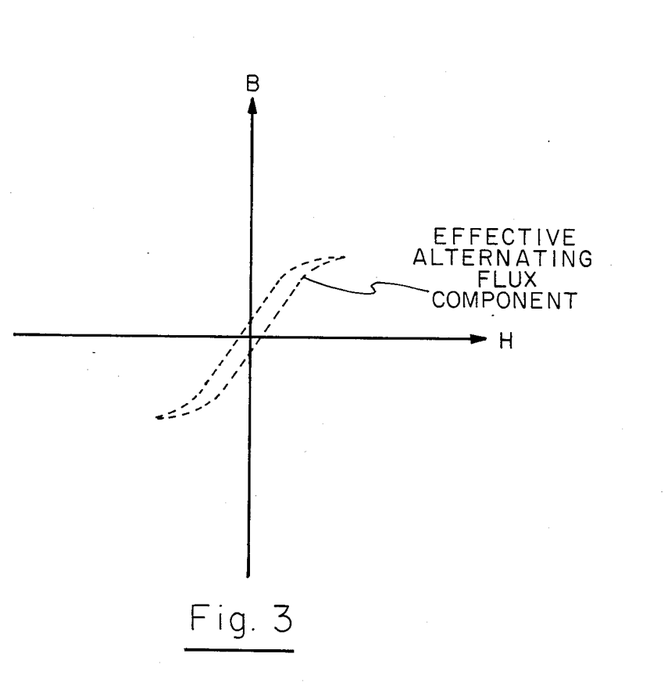
FIG. 3 illustrates the alternating flux component (alone) of the FIG. 2 graph.

FIG. 2 shows, in solid line, a B-H curve for a typical core material operating in saturation. The dashed line represents a DC or static component, and the dotted line represents an alternating component, these two components being attainable using an arrangement such as one illustrated below in FIG. 4. FIG. 3 illustrates the alternating flux component (alone) and shows the resultant reduction in the area inside the hysteresis curve for the alternating flux component. It is seen that "effective" saturation occurs at reduced flux density, thereby decreasing the losses encountered.

Figure 4:
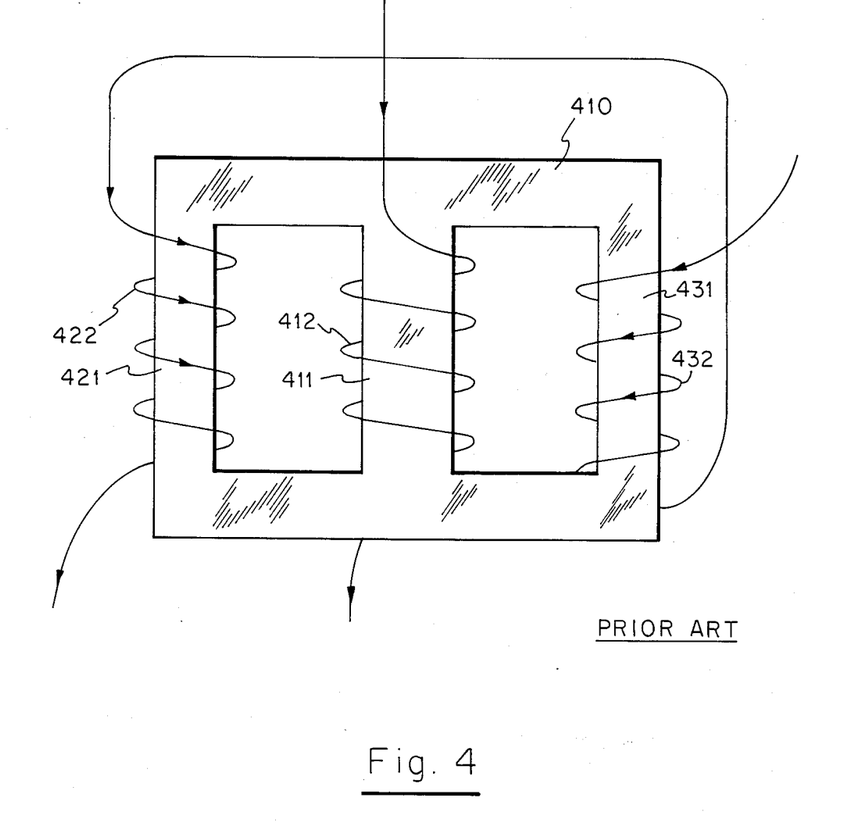
FIG. 4 illustrates a core with a known arrangement for obtaining constant flux bias.

FIG. 4 illustrates an example of a known arrangment that has been utilized to achieve constant flux bias. A core 410 has a central limb 411 and outer limbs 421 and 431. A primary winding 412 (and secondary winding(s)—not shown) is illustrated as being wound on the central limb 411. Flux bias windings 422 and 432 are connected in series arrangement and are respectively wound on limbs 421 and 431 in the manner illustrated. With flux bias applied on the outer two limbs, saturation is enhanced in one limb but retarded in the other. As alternating flux phase is reversed, the retardation and enhancement of flux in the outer two limbs is reversed from the initial condition. The level of alternating flux saturation can be altered by varying the level of bias. In the present embodiment of the invention, DC flux bias is used to advantage, in conjunction with other features, in a ferroresonant power supply, as will be described. It is also known that flux bias can be applied using a single bias winding, for example by employing a technique known as orthogonal saturation. In the present invention, any suitable type of flux biasing can be employed, consistent with the principles set forth.

Figure 5:
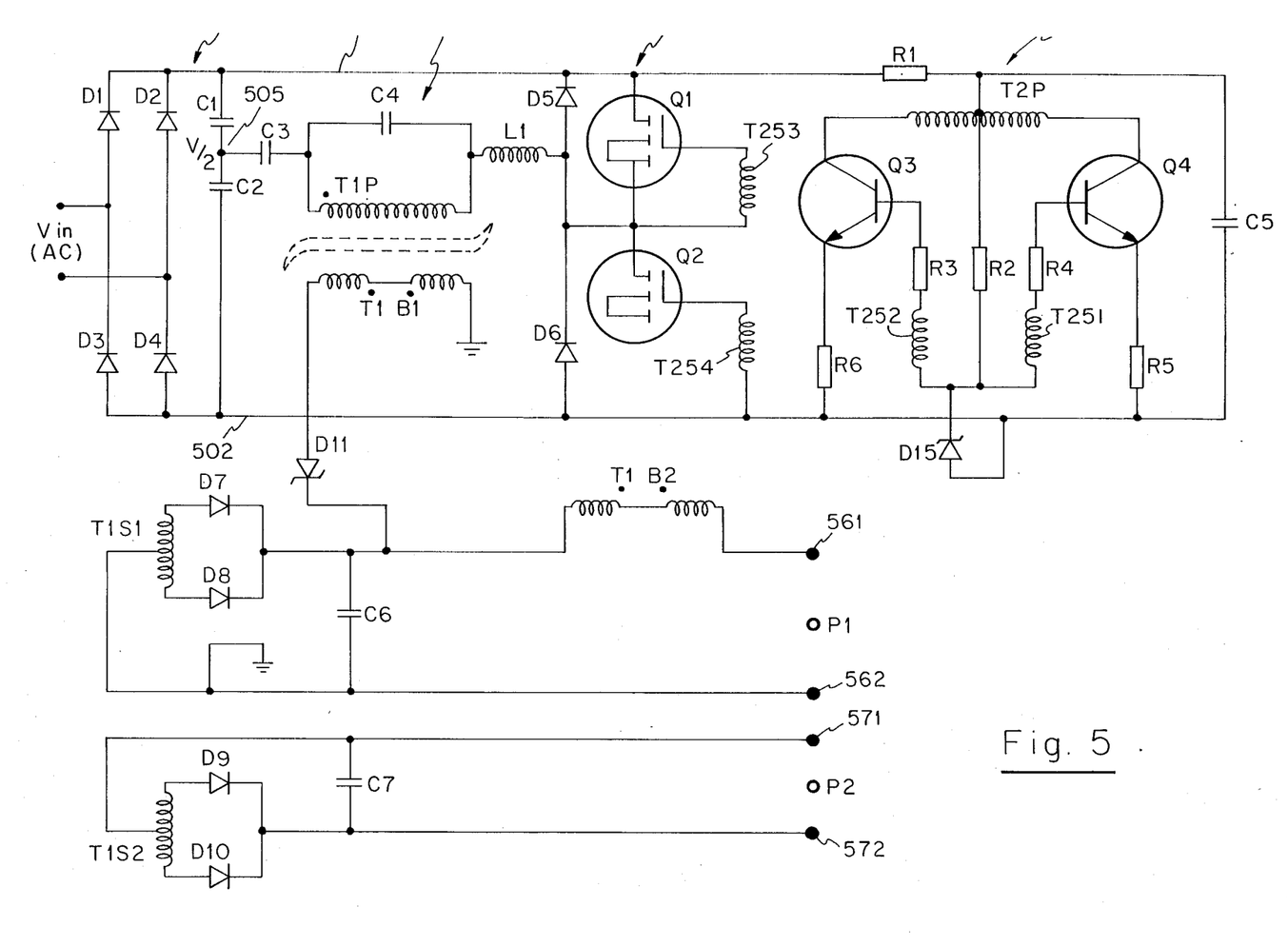
FIG. 5 is a schematic diagram of an apparatus in accordance with an embodiment of the invention, and which can be used to practice the method of the invention.

Referring to FIG. 5, there is shown a schematic diagram of a power supply in accordance with an embodiment of the invention, and which can be used to practice the method of the invention. An AC energizing signal is applied to rectifying and smoothing circuitry 511 that includes diodes D1, D2, D3 and D4, in a full-wave rectifier arrangement, and smoothing capacitors C1 and C2, between lines 501 and 502. The voltage output (V) from the rectifying and smoothing circuitry 511 is supplied, via resistor R1, to an oscillator circuit 421. The oscillator 531 includes transistors Q3 and Q4, the collectors of which are coupled across the primary winding T2P of a transformer T2. The center tap of winding T2P is coupled to resistor R1, and also, via resistor R2, to the bases of respective transistors Q3 and Q4 via winding T2S2 and R3 (in the case of transistor Q3), and via winding T2S1 and resistor R4 (in the case of transistor Q4). The windings T2S2 and T2S1 are secondary windings of the transformer T2. The emitters of the transistors Q3 and Q4 are coupled to the line 502 via respective resistors R6 and R5. Also, a zener diode D15, used for starting, is coupled between the line 502 and the junction of windings T2S1 and T2S2, and a capacitor C5 is coupled between the center tap of T2P and the line 502.

The oscillator circuit 521 drives an AC switch circuit 531. A pair of field-effect transistors Q1 and Q2 are coupled in series between the lines 501 and 502, with the drain electrode of Q1 being coupled to the line 501, the source electrode of Q1 being coupled to the drain electrode of Q2, and the source electrode of Q2 being coupled to the line 502. A further secondary winding T2S3 of the transformer T2 is coupled between the gate and source electrodes of Q1, and a further secondary winding T2S4 of transformer T2 is coupled between the gate and source electrodes of transistor Q2. A diode D5 is coupled across the source and drain electrodes of Q1, and a diode D6 is coupled across the source and drain electrodes of transistor Q2. The junction between transistors Q1 and Q2 is also coupled to a ferroresonant circuit 541.

In the present embodiment, the ferroresonant circuit 541 includes a choke L1 having one side coupled to the junction between the transistors Q1 and Q2 of AC switching circuit 531 and its other side coupled to one side of a capacitor C4, the other side of which is coupled, via capacitor C3, to a return point 505 between capacitors C1 and C2. [If desired, C3 can be eliminated if a small gap is placed in the core of T1.] The return point is at a voltage V/2. The primary winding T1P of a transformer T1 is coupled across the capacitor C4. The transformer T1 may have a number of secondary windings, two of which are shown in FIG. 5, and designated as T1S1 and T1S2, respectively. In the embodiment of FIG. 5, the center tap of secondary winding T1S1 is coupled to ground reference potential, and the ends of the winding are coupled to rectifying diodes D7 and D8. A smoothing capacitor C6 is coupled between the junction of the diodes (D7 and D8) and ground reference potential. A first DC output OP1 is presented across the terminals 561, 562.

The transformer T1 has bias windings designated T1B1 coupled, via a zener diode D11, between ground reference potential and the output OP1. The transformer T1 can also be provided with current-sensing bias windings T1B2 in series with the output rail of OP1 to provide biasing based on output current as well as output voltage. It will be understood that the DC flux bias can based on a sensed voltage, a sensed current, or both, as illustrated.

Another output, OP2, is developed from secondary winding T1S2. The center tap of T1S2 is coupled to terminal 571, and the ends of the winding are coupled to rectifiying diodes D9 and D10. A smoothing capacitor C7 is coupled between the junction of the diodes (D9 and D10), and a DC output is presented across terminals 571, 572.

In operation of the circuit of FIG. 5, the AC input is rectified by the arrangement of diodes D1-D4, and capacitors C1 and C2 provide smoothing. The oscillator circuit 521 operates at a frequency that is substantially determined by the growth of magnetizing current in the transformer primary and, hence, the current in transistors Q3 and Q4. Thus, for example, R6 and R5 can be selected to obtain a desired frequency, or can be made adjustable. The oscillator 521 controls the switching of transistors Q1 and Q2, since the gate circuits of these field-effect transistors contain secondary windings of the transformer T2, so that the field-effect transistors Q1 and Q2 are driven at the oscillator frequency. A half-bridge drive circuit is formed via Q1 and Q2 operating alternately. In the present embodiment, the transformer primary T1P and C4 comprise a ferroresonant circuit in which the primary inductance of transformer T1 is modulated by controlling saturation of the transformer core. L1 and C4 are selected to be approximately resonant at the frequency of the oscillator.

The capacitor C3 presents high reactance at the supply frequency, and prevents mains ripple reflecting on secondary outputs. If desired, C3 can be replaced by a small gap in the T1 core.

At very high frequency operation, L1 can be virtually eliminated, since the T1 primary leakage inductance to secondaries forms a large portion of this inductive component.

Due to natural ferroresonance of the ferroresonant circuit at the oscillator frequency, Q1 and Q2 switch at zero current. Constant frequency is maintained and, unlike typical resonant power supplies which operate at constant frequency, load current through the switching devices Q1, Q2 reduces with reduced load (see FIG. 6, below).

The outputs the secondary windings of T1 are rectified and smoothed to obtain the desired output voltages. In the embodiment of FIG. 5, the circuit associated with the secondary winding T1S1 is used for regulation and reference purposes. If the output voltage at OP1 is less than the breakdown voltage of zener diode D11, no current flows in the bias windings T1B1, and the AC in the ferroresonant circuit will build up until the rectified output at OP1 is sufficient to overcome the threshold of D11. When D11 conducts, DC flux bias is applied to the core. Accordingly, at a given operating frequency and output voltage, the core losses are controlled by controlling the DC flux bias so as to change the AC flux necessary to achieve saturation for ferroresonance. As previously noted, the DC flux bias can also be applied as a function of output current, as is the case for bias windings T1B2 associated with OP1.

Figure 6:
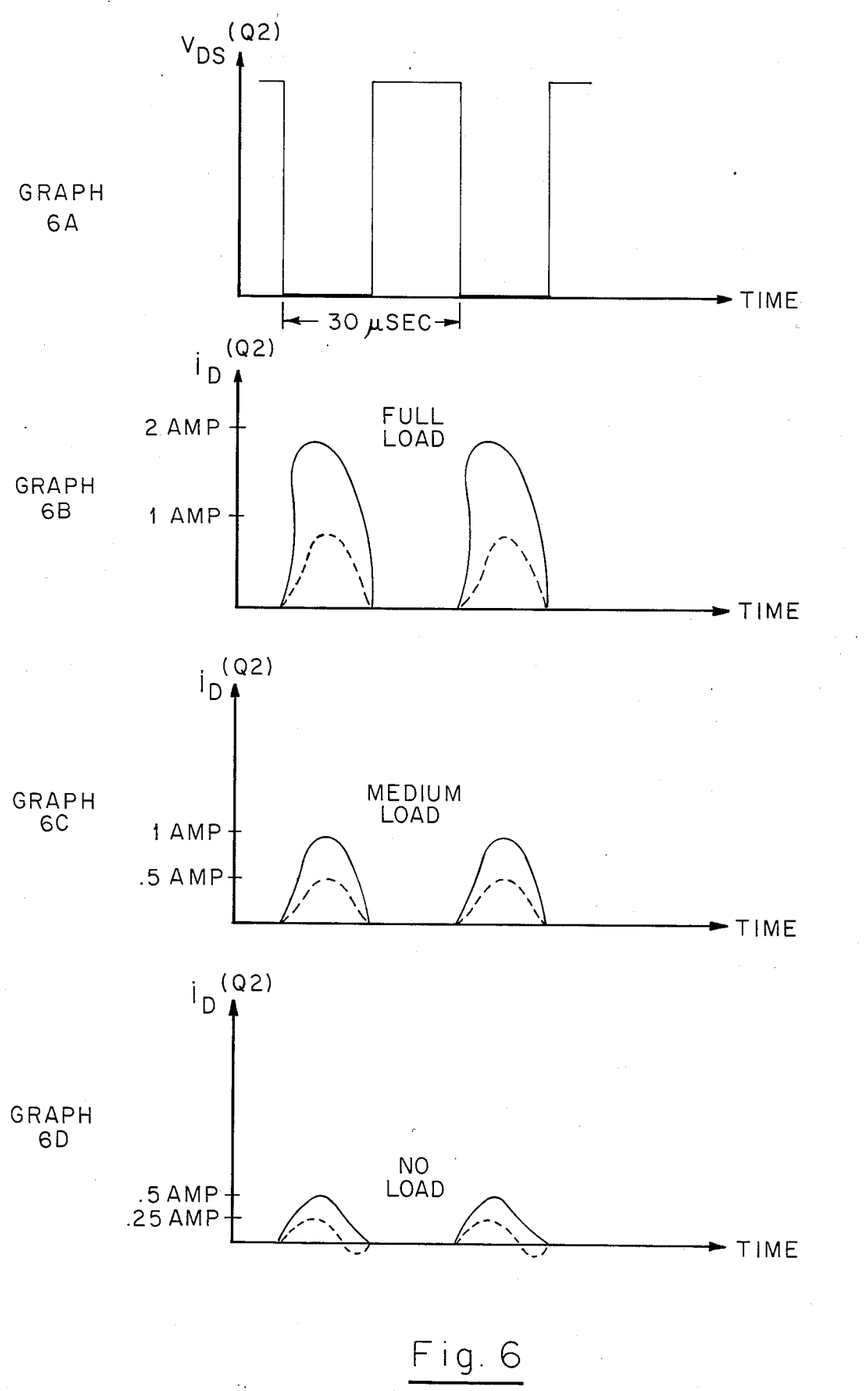
FIG. 6, which includes graphs 6A, 6B, 6C and 6D, illustrates current and voltage characteristics of a portion of the power supply circuitry in accordance with an embodiment of the invention.

FIG. 6 illustrate voltage and current waveforms in an example of the FIG. 5 embodiment. Graph 6A illustrates the drain-to-source voltage $V_{DS}$ of Q2 for an oscillator frequency of about 33 KHz. Graphs 6B, 6C and 6D show the Q2 drain current $i_D$ for minimum input voltage (solid line) and maximum input voltage (dashed line) conditions for respective input voltages of 80 volts AC, 115 volts AC, and 140 volts AC. As above stated, load current through the switching devices reduces with reduced load. Operation is achieved over a very wide range of input voltages.

As first noted above, the ferroresonant power supply of the present invention can operate at relatively high frequencies, for example above 20 KHz and up to about 1 MHz, using standard core materials and without unacceptable losses. Control of the output is obtained by the ferroresonant circuit and without the need for frequency modulation or other circuit complications that are often used with zero-current switching techniques. Also, the power supply hereof has been demonstrated to operate over a wide range of input voltages.

The invention has been described with reference to a particular preferred embodiment, but variations within the spirit and scope of the invention will occur to those skilled in the art. For example, in the embodiment set forth, the input signal is an AC signal, and the outputs are DC signals. Instead of starting with a AC signal that is rectified and smoothed, one could operate directly on a DC signal. Also, one or more of the outputs taken from secondary windings of transformer T1 could be used in AC form. Regarding the ferroresonant circuit itself, while the circuit set forth is preferred, it will be understood that other configurations can be utilized, such as providing resonating reactive components in conjunction with the secondary of the ferroresonant transformer.

I claim:

1. A power supply, comprising:

a ferroresonant circuit, including a transformer with a core of magnetic material, a primary winding, a secondary winding and reactive means coupled with at least one of said windings;

said transformers having a pair of bias windings;

means for applying an alternating voltage to said ferroresonant circuit, said alternating voltage having a frequency that is approximately equal to a resonant frequency of said ferroresonant circuit;

an output circuit coupled to said secondary winding; and means for sensing a signal in said output circuit and for applying a feedback signal to said bias windings in accordance with the sensed signal.

2. The power supply as defined by claim 1, wherein said transformer has at least one further secondary winding, and further comprising at least one further output circuit coupled to said at least one further secondary winding.

3. The power supply as defined by claim 2, wherein said output circuits each include means for rectifying and smoothing the signals from their respective secondary windings to obtain respective DC outputs.

4. The power supply as defined by claim 2, wherein said means for sensing a signal in said output circuit comprises means for sensing the DC output level of said output circuit.

5. The power supply as defined by claim 4, wherein said bias windings are coupled to said DC output level via a zener diode.

6. The power supply as defined by claim 4, wherein said means for applying an alternating voltage to said ferroresonant circuit includes an oscillator for generating alternating voltage control signals; and a switching circuit, under control of said oscillator, for generating said alternating voltage signals.

7. The power supply as defined by claim 1, wherein said output circuit includes means for rectifying and smoothing the signal from said secondary winding to obtain a DC output.

8. The power supply as defined by claim 1, wherein said means for sensing a signal in said output circiut comprises means for sensing the DC output level of said output circuit.

9. The power supply as defined by claim 8, wherein said bias windings are coupled to said DC output level via a zener diode.

10. The power supply as defined by claim 8, wherein said means for applying an alternating voltage to said ferroresonant circuit includes an oscillator for generating alternating voltage control signals, and a switching circuit, under control of said oscillator, for generating said alternating voltage signals.

11. The power supply as defined by claim 10, wherein said switching circuit comprises a circuit which operates with substantially zero current switching.

12. The power supply as defined by claim 1, wherein the frequency of the alternating voltage signal applied to said ferroresonant circuit is greater than 20 KHz.

13. The power supply as defined by claim 1, wherein said means for applying an alternating voltage to said ferroresonant circuit includes an oscillator for generating alternating voltage control signals, and a switching circuit, under control of said oscillator, for generating said alternating voltage signals.

14. The power supply as defined by claim 13, wherein said switching circuit comprises a circuit which operates with substantially zero current switching.

15. The power supply circuit as defined by claim 1, wherein said reactive means comprises a capacitor coupled across the primary winding of said transformer.

16. The power supply as defined by claim 15, wherein said reactive means further comprises an inductor coupled to said capacitor.

17. The power supply as defined by claim 16, wherein a resonant frequency of said ferroresonant circuit is at the resonance of said capacitor and inductor.

18. A power supply, comprising:
a ferroresonant circuit, including a transformer with a core of magnetic material, a primary winding, a secondary winding and reactive means coupled with at least one of said windings;
controllable means for flux biasing the transformer core;
means for applying a zero current switched alternating voltage to said ferroresonant circuit, said alternating voltage having a frequency that is greater than 20 KHz and is approximately equal to a resonant frequency of said ferroresonant circuit;
an output circuit coupled to said secondary winding; and
means for sensing a signal in said output circuit and for applying a feedback signal to said controllable flux biasing means in accordance with the sensed signal.

19. The power supply as defined by claim 18, wherein said means for sensing a signal in said output circuit comprises means for sensing the DC output level of said output circuit.

20. The power supply as defined by claim 19, wherein said transformer has at least one further secondary winding, and further comprising at least one further output circuit coupled to said at least one further secondary winding.

21. A power supply, comprising:
a ferroresonant circuit, including a transformer with a core of magnetic material, a primary winding, a secondary winding, a capacitor coupled across said primary winding, and an inductor coupled to said capacitor;
said transformer having a pair of bias windings;
means for coupling an alternating voltage across said inductor and capacitor, said alternating voltage having a frequency that is approximately equal to the resonant frequency of the circuit including said inductor and capacitor;
an output circuit coupled to said secondary winding, said output circuit including rectifier means for generating a DC output; and
means for sensing the DC output and for applying a feedback signal to said bias windings in accordance with the sensed signal.

22. The power supply as defined by claim 21, wherein said transformer has at least one further secondary winding, and further comprising at least one further output circuit coupled to said at least one further secondary winding.

23. The power supply as defined by claim 22, wherein the frequency of the alternating voltage signal applied to said ferroresonant circuit is greater than 20 KHz.

24. The power supply as defined by claim 21, further comprising: a further bias winding, means for sensing the current in said DC output circuit, and means for applying a further feedback signal to said further bias winding in accordance with the sensed current.

25. The power supply as defined by claim 21, wherein the frequency of the alternating voltage signal applied to said ferroresonant circuit is greater than 20 KHz.

26. The power supply as defined by claim 21, wherein said means for applying an alternating voltage to said ferroresonant circuit includes an oscillator for generating alternating voltage control signals, and a switching circuit, under control of said oscillator, for generating said alternating voltage signals.

27. The power supply as defined by claim 21, wherein said switching circuit comprises a circuit which operates with substantially zero current switching.

28. A method for generating a DC voltage supply, comprising the steps of:
providing a ferroresonant circuit, including a transformer with a core of magnetic material, a primary winding, a secondary winding and reactive means coupled with at least one of said windings, said transformer having a bias winding;

providing an oscillator for generating alternating voltage control signals and a switching circuit, under control of said oscillator, for generating said alternating voltage signals at a frequency that is approximately equal to a resonant frequency of said ferroresonant circuit;

switching the switching circuit at substantially zero current;

applying said alternating voltage to said ferroresonant circuit;

rectifying and smoothing the signal from the secondary winding to obtain a DC output voltage; and sensing the output voltage, and applying a feedback signal to said bias winding in accordance with the sensed voltage.

29. The method as defined by claim 28, wherein said transformer has at least one further secondary winding, and further comprising the step of rectifying and smoothing the signal from the further secondary winding to obtain a further DC output voltage.

30. The method as defined by claim 29, wherein the frequency of the alternating voltage applied to said ferroresonant circuit is greater than 20 KHZ.

31. The method as defined by claim 28, wherein the frequency of the alternating voltage applied to said ferroresonant circuit is greater than 20 KHZ.

32. A power supply, comprising:
a ferroresonant circuit, including a transformer with a core of magnetic material, a primary winding, a secondary winding and reactive means coupled with at least one of said windings;
said transformer having a bias winding and a further bias winding;
means for applying an alternating voltage to said ferroresonant circuit, said alternating voltage having a frequency that is approximately equal to a resonant frequency of said ferroresonant circuit;
an output circuit coupled to said secondary winding;
means for sensing a DC voltage level of said output circuit and for applying a feedback signal to said bias winding in accordance with the sensed DC voltage level; and
means for sensing a current in said output circuit and for applying a feedback signal to said further bias winding in accordance with the sensed current.

33. The power supply as defined by claim 32, wherein the frequency of the alternating voltage signal applied to said ferroresonant circuit is greater than 20 KHz.

34. A method for generating a DC voltage supply, comprising the steps of:
providing a ferroresonant circuit, including a transformer with a core of magnetic material, a primary winding, a secondary winding and reactive means coupled with at least one of said windings, said transformer having a bias winding;
applying an alternating voltage to said ferroresonant circuit, said alternating voltage having a frequency that is greater than 20 KHz and is approximately equal to a resonant frequency of said ferroresonant circuit;
rectifying and smoothing the signal from the secondary winding to obtain a DC output voltage; and sensing the output voltage, and applying a feedback signal to said bias winding in accordance with the sensed voltage.

35. The method as defined by claim 34, wherein said transformer has at least one further secondary winding, and further comprising the step of rectifying and smoothing the signal from the further secondary winding to obtain a further DC output voltage.

36. A power supply, comprising:
a ferroresonant circuit, including a transformer with a core of magnetic material, a primary winding, a secondary winding and reactive means coupled with at least one of said windings;
said transformer having a bias winding;
an oscillator for generating alternating voltage control signals;
a zero current switching circuit, under control of said oscillator, for applying an alternating voltage to said ferroresonant circuit, said alternating voltage having a frequency that is approximately equal to a resonant frequency of said ferroresonant circuit;
an output circuit coupled to said secondary winding; and
means for sensing a signal in said output circuit and for applying a feedback signal to said bias winding in accordance with the sensed signal.

37. The power supply as defined by claim 36, wherein said transformer has at least one further secondary winding, and further comprising at least one further output circuit coupled to said at least one further secondary winding.

38. The power supply as defined by claim 36, wherein said output circuit includes means for rectifying and smoothing the signal from said secondary winding to obtain a DC output.

39. The power supply as defined by claim 50, wherein said means for sensing a signal in said output circuit comprises means for sensing the DC output level of said output circuit.

40. The power supply as defined by claim 36, wherein said oscillator has a frequency of at least 20 KHz.

41. A power supply, comprising:
a ferroresonant circuit, including a transformer with a core of magnetic material, a primary winding, a secondary winding, a capacitor coupled across said primary winding, and an inductor coupled to said capacitor;
said transformer having a bias winding;
means for coupling a zero current switched alternating voltage across said inductor and capacitor, said alternating voltage having a frequency that is at least 20 KHz and is approximately equal to the resonant frequency of the circuit including said inductor and capacitor;
an output circuit coupled to said secondary winding, said output circuit including rectifier means for generating a DC output, and
means for sensing the DC output and for applying a feedback signal to said bias winding in accordance with the sensed signal.

42. The power supply as defined by claim 41, wherein said transformer has at least one further secondary winding, and further comprising at least one further output circuit coupled to said at least one further secondary winding

* * * * *